US012725283B2

(12) United States Patent
Seok

(10) Patent No.: US 12,725,283 B2
(45) Date of Patent: Sep. 1, 2026

(54) METHOD, SERVER, AND COMPUTER PROGRAM FOR PERFORMING REGISTRATION BETWEEN MULTIPLE IMAGES OF DIFFERENT DIMENSIONS

(71) Applicant: 3D ONS, INC., Seoul (KR)

(72) Inventor: Ju Heon Seok, Seoul (KR)

(73) Assignee: 3D ONS, INC., Seoul (KR)

( * ) Notice: Subject to any disclaimer, the term of this patent is extended or adjusted under 35 U.S.C. 154(b) by 509 days.

(21) Appl. No.: 18/173,546

(22) Filed: Feb. 23, 2023

(65) Prior Publication Data

US 2023/0377175 A1 Nov. 23, 2023

(30) Foreign Application Priority Data

May 19, 2022 (KR) ........................ 10-2022-0061643

(51) Int. Cl.
*G06T 7/33* (2017.01)
*G06T 3/20* (2006.01)
(Continued)

(52) U.S. Cl.
CPC .................. *G06T 7/33* (2017.01); *G06T 3/20* (2013.01); *G06T 3/40* (2013.01); *G06T 3/60* (2013.01);
(Continued)

(58) Field of Classification Search
CPC ............. G06T 7/30; G06T 2207/10081; G06T 2207/10116; G06T 2207/30036; G06T 2207/30201; A61B 6/51; A61B 5/0077; A61B 5/0088; A61B 6/5247; A61B 5/0037; A61B 34/10; A61B 6/5229;
(Continued)

(56) References Cited

U.S. PATENT DOCUMENTS

2011/0244415 A1* 10/2011 Batesole .................. A61C 7/00 433/24
2013/0137974 A1* 5/2013 Sakaguchi ........... A61B 5/0044 378/98.2
(Continued)

FOREIGN PATENT DOCUMENTS

KR 10-2011-0006984 A 1/2011
KR 10-1953629 B1 3/2019
(Continued)

OTHER PUBLICATIONS

The extended European search report issued by the European Patent Office on Oct. 11, 2023, which corresponds to European Patent Application No. 23174150.5-1224 and is related to U.S. Appl. No. 18/173,546.

*Primary Examiner* — Sumati Lefkowitz
*Assistant Examiner* — Wayne Zhang
(74) *Attorney, Agent, or Firm* — Studebaker Brackett PLLC

(57) ABSTRACT

Provided is a method of performing registration between a plurality of images of different dimensions. The method may be performed by one or more processors of a computing device, and may include primarily positioning a three-dimensional (3D) image by identifying a first landmark in the 3D image, generating a registration image by registration between the primarily positioned 3D image and a two-dimensional (2D) image, and secondarily positioning the registration image.

7 Claims, 12 Drawing Sheets

(51) Int. Cl.
*G06T 3/40* (2024.01)
*G06T 3/60* (2024.01)

(52) U.S. Cl.
CPC ............... *G06T 2207/10081* (2013.01); *G06T 2207/10116* (2013.01); *G06T 2207/30036* (2013.01); *G06T 2207/30201* (2013.01)

(58) Field of Classification Search
CPC ............ A61B 6/5235; A61B 2034/102; A61B 2034/105; A61B 2576/00; G16H 30/40; A61C 7/002
See application file for complete search history.

(56) References Cited

U.S. PATENT DOCUMENTS

| | | | | |
|---|---|---|---|---|
| 2013/0328869 | A1* | 12/2013 | Choi | G06T 19/20 345/419 |
| 2019/0005309 | A1* | 1/2019 | Hyun | G06F 3/012 |
| 2020/0187881 | A1* | 6/2020 | Lim | A61B 5/0077 |
| 2022/0028078 | A1* | 1/2022 | Shelton | G06T 7/73 |
| 2022/0068109 | A1* | 3/2022 | Zeng | G06V 40/165 |
| 2023/0024671 | A1* | 1/2023 | Kim | G06N 3/0464 |

FOREIGN PATENT DOCUMENTS

| | | | |
|---|---|---|---|
| KR | 10-2020-0075623 | A | 6/2020 |
| KR | 10-2021-0000942 | A | 1/2021 |
| KR | 10-2021-0118328 | A | 9/2021 |

* cited by examiner

10

20

30

METHOD, SERVER, AND COMPUTER PROGRAM FOR PERFORMING REGISTRATION BETWEEN MULTIPLE IMAGES OF DIFFERENT DIMENSIONS

CROSS-REFERENCE TO RELATED APPLICATION

This application claims priority to and the benefit of Korean Patent Application No. 10-2022-0061643, filed on May 19, 2022, the disclosure of which is incorporated herein by reference in its entirety.

BACKGROUND

1. Field of the Invention

Various embodiments of the present disclosure relate to image registration, and more particularly, to a method, a server, and a computer program for performing registration between a two-dimensional (2D) image and a three-dimensional (3D) image.

2. Discussion of Related Art

Cone-beam computed tomography (CBCT) introduced in the 1990s has brought about an epoch-making change in the field of oral and maxillofacial radiology. CBCT enables a three-dimensional (3D) diagnosis of the teeth and jawbone, which cannot be performed by conventional general radiography, and allows images to be obtained with lower radiation exposure than when general CT is used. In addition, CBCT equipment can be installed in a smaller space and purchased at a relatively low price.

"Field of view (FoV)" is generally understood as a field of vision or visibility but an FOV of CBCT is understood as a range or volume of inspection and photographing of specific CBCT equipment in the field of CBCT and is in a spherical or cylindrical form according to the type of the CBCT equipment. CBCT may be classified into small volume CBCT, medium volume CBCT, and large volume CBCT according to a size of the FoV.

Today, small volume CBCT is widely used in dental clinics to photograph only regions of the upper and lower jaws. A small volume CBCT device captures and displays an image of a six or four sections of the jawbone, and is used for root canals or to diagnose a lesion in an area of three crowns or less, to establish a treatment plan for placement of one or two implants, to make a diagnosis for extraction of a jutted wisdom tooth, or to diagnose the temporomandibular joint. Korean Patent Registration No. 10-1953629 discloses dividing the lower jawbone in a CBCT image to diagnose teeth.

However, it is difficult to check a degree to which an upper-and-lower jaw area warps on the basis of a 3D image (e.g., a CT image) obtained by photographing only this area. Specifically, it is possible to determine whether an upper-and-lower jaw area warps on the basis of a CT image of an entire face area with respect to a landmark on a specific part (e.g., forehead), but a 3D image related to the upper and lower jaws has no reference point and thus it may be difficult to determine whether the upper and lower jaws warp on the basis of the 3D image.

Accordingly, there may be a demand in this art for the development of technology for registration between a 3D image and a two-dimensional (2D) image (e.g., an X-ray image related to a cephalometric view) that are related to the upper and lower jaws to provide a logical criterion for a diagnosis and analysis of the 3D image.

SUMMARY OF THE INVENTION

In response to the above-described background art, the present disclosure is directed to providing a logical criterion for diagnosis and analysis of a three-dimensional (3D) image by registration between the 3D image and a two-dimensional (2D) image (e.g., an X-ray image related to a cephalometric view) that are related to the upper and lower jaws.

Aspects of the present disclosure are not limited thereto and other aspects that are not described here will be clearly understood by those of ordinary skill in the art from the following description.

An embodiment of the present disclosure provides a method of performing registration between a plurality of images of different dimensions. The method is performed by one or more processors of a computing device, and includes primarily positioning a three-dimensional (3D) image by identifying a first landmark in the 3D image, generating a registration image by registration between the primarily positioned 3D image and a two-dimensional (2D) image, and secondarily positioning the registration image.

In an alternative embodiment, the 3D image may be a computed tomography (CT) image obtained by photographing an upper-and-lower jaw area, and the 2D image may be a cephalo image obtained by X-raying a profile of the face.

In an alternative embodiment, the first landmark may include a first landmark (A) and a first landmark (B) related to left and right sides of the face and a first landmark (C) and a first landmark (D) related to front and rear sides of the face, and the primary positioning of the 3D image may include performing y-axis rotation about the first landmark (C) to match a z-coordinate of the first landmark (A) with a z-coordinate of the first landmark (B), and performing z-axis rotation about the first landmark (C) to match a y-coordinate of the first landmark (A) with a y-coordinate of the first landmark (B).

In an alternative embodiment, the generating of the registration image may include matching directions of the head and the face in the 3D image with those of the head and the face in the 2D image, converting a size of the 2D image on the basis of the first landmark in the 3D image and a second landmark in the 2D image, and overlapping the 3D image and the 2D image by moving the size-converted 2D image on the basis of coordinates of the first landmark in the 3D image, and the second landmark may include a second landmark (A) and a second landmark (B) related to the front and rear sides of the face.

In an alternative embodiment, the matching of the directions of the head and the face in the 3D image with those in the head and the face in the 2D image may include causing the head to be oriented in a positive z-axis direction and the face to be orientated in a negative y-axis direction.

In an alternative embodiment, the converting of the size of the 2D image on the basis of the first landmark in the 3D image and the second landmark in the 2D image may include identifying a first straight line connecting the first landmark (C) and the first landmark (D) in the 3D image, identifying a second straight line connecting the second landmark (A) and the second landmark (B) in the 2D image, and obtaining a size conversion ratio on the basis of the first straight line and the second straight line, and converting the size of the 2D image on the basis of the obtained size conversion ratio.

In an alternative embodiment, the overlapping of the 3D image and the 2D image by moving the size-converted 2D image on the basis of the coordinates of the first landmark in the 3D image may include moving the size-converted 2D image to match coordinates of the second landmark (A) with the coordinates of the first landmark (C), and rotating the 2D image about the x-axis to overlap a first straight line connecting the first landmark (C) and the first landmark (D) in the 3D image and a second straight line connecting the second landmark (A) and the second landmark (B) in the 2D image.

In an alternative embodiment, the secondary positioning of the registration image may include secondarily positioning the registration image on the basis of a third landmark in the registration image, and the third landmark may include a third landmark (A) related to an orbitale, a third landmark (B) related to a porion, and a third landmark (C) related to a nasion.

In an alternative embodiment, the secondary positioning of the registration image may include performing rotation about the x-axis to cause a first line connecting the third landmark (A) and the third landmark (B) to be parallel with the y-axis, and performing parallel translation of the registration image to cause the third landmark (C) in the rotated registration image to be an origin.

Another embodiment of the present disclosure provides a server for performing a method of performing registration between a plurality of images of different dimensions. The server includes a memory storing one or more instructions, and a processor configured to execute the one or more instructions stored in the memory, and the processor may execute the one or more instructions to perform the method of performing registration between a plurality of images of different dimensions.

Another embodiment of the present disclosure provides a recording medium readable by a computing device and having recorded thereon a program for executing a method of performing registration between a plurality of images of different dimensions in combination with a computing device that is hardware.

Other aspects of the present disclosure will be apparent from the detailed description and drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
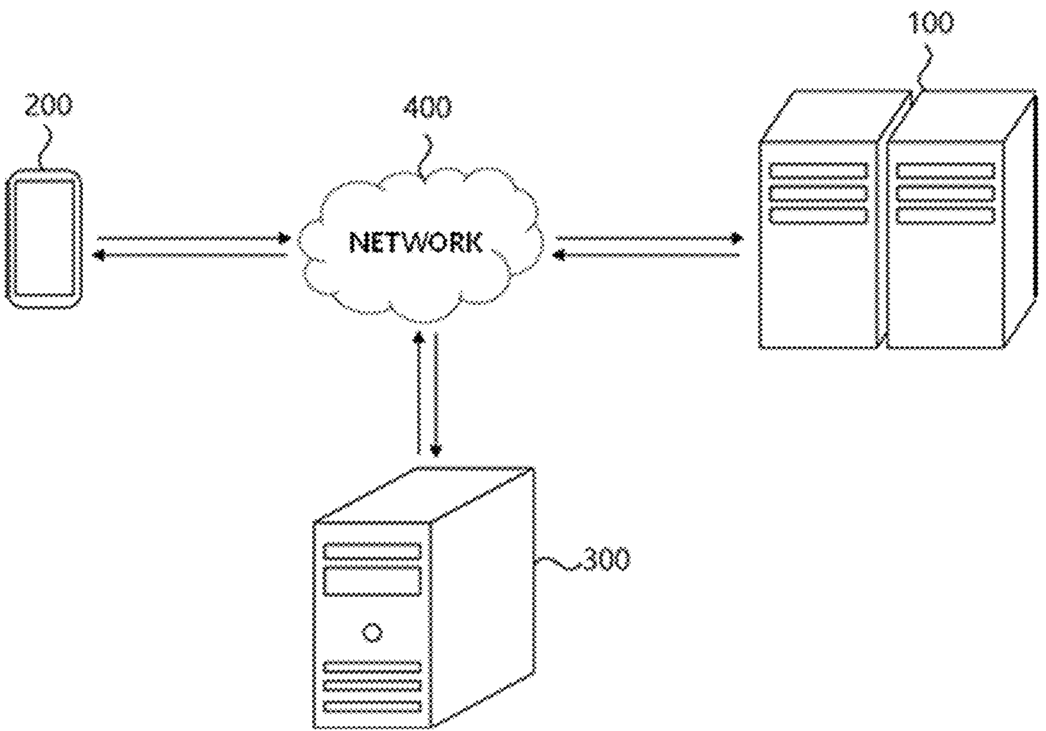
FIG. 1 is a diagram schematically illustrating a system for performing a method of performing registration between a plurality of images of different dimensions according to an embodiment of the present disclosure.

Hereinafter, various embodiments will be described with reference to the accompanying drawings. In the present specification, various embodiments are provided to help understanding of the present disclosure. However, it will be clear that embodiments can be easily implemented without a detailed description thereof.

The term "component," "module," "system," or the like, when used herein, refers to a computer-related entity, hardware, firmware, software, combination of software and hardware, or execution of software. For example, a component may be understood as, but is not limited to, a procedure performed by a processor, a processor, an object, an execution thread, a program, and/or a computer. For example, both an application executed by a computing device and the computing device may be components. One or more components may reside in a processor and/or an execution thread. One component may be localized in one computer. One component may be distributed between two or more computers. These components may be run from various computer-readable media storing various data structures therein. Components may communicate with each other through local and/or remote processing, for example, according to a signal containing one or more data packets (e.g., data transmitted from a system through a network such as the Internet according to data and/or a signal from one component interacting with another component in a local or distributed system).

In addition, the term "or" is intended to mean inclusive "or" rather than exclusive "or." That is, "X uses A or B" is intended to indicate natural inclusive substitutions unless otherwise specified or contextually clear. That is, "X uses A or B" should be understood to mean that X uses A, X uses B, or X uses both A and B. The term "and/or" when used herein should be understood to refer to and include all possible combinations of one or more of relevant items listed herein.

In addition, "comprise" and/or "comprising" should be understood to mean the presence of a corresponding feature and/or component. However, it will be understood that the terms "comprise" and/or "comprising" do not preclude the presence or addition of one or more other features, components, and/or groups thereof. Each singular form described in the detailed description and claims should be understood to generally mean "one or more" unless otherwise specified or contextually clear as indicating a singular form.

It will be understood by those of ordinary skill in the art that various examples of logical blocks, configurations, modules, circuits, means, logic, and operations of an algorithm additionally described below in relation to embodiments set forth herein can be implemented by electronic hardware, computer software, or a combination thereof. To clearly indicate the interchangeability of hardware and software, various examples of components, blocks, configurations, means, logic, modules, circuits, and operations have been generally described above in terms of functionalities thereof. Whether to implement such functionality by hardware or software depends on specific applications and design limitations imposed on an overall system. It will be obvious that functionalities described in various ways with respect to the specific applications can be implemented by skilled technicians. However, decisions of such implementation should not be understood to exceed the scope of the present disclosure.

A description of embodiments set forth herein is provided to help those of ordinary skill in the art use or implement the present disclosure. It will be apparent to those of ordinary skill in the art that various modifications can be made in these embodiments. General principles defined herein may apply to other embodiments without departing from the scope of the present disclosure. Therefore, the present disclosure is not limited to embodiments set forth herein. The present disclosure should be interpreted within the broadest range consistent with the principles and novel features described herein.

As used herein, the term "computer" should be understood to mean various types of hardware devices, including at least one processor, and may be understood to include a software component operating in a corresponding hard device according to an embodiment. For example, a computer may be understood to include, but is not limited to, a smart phone, a tablet PC, a desktop computer, a laptop computer, and a user client and an application running on each device.

Hereinafter, embodiments of the present disclosure will be described in detail with reference to the accompanying drawings.

Operations described herein will be described as being performed by a computer, but a subject of each of the operations is not limited thereto and at least some of the operations may be performed by different devices according to an embodiment.

FIG. 1 is a diagram schematically illustrating a system for performing a method of performing registration between a plurality of images of different dimensions according to an embodiment of the present disclosure.

As illustrated in FIG. 1, a system according to embodiments of the present disclosure may include a server 100, a user terminal 200, an external server 300, and a network 400. The components shown in FIG. 1 are only examples and thus other components may be added or some of the components shown in FIG. 1 may be omitted. The server 100, the external server 300, and the user terminal 200 according to embodiments of the present disclosure may transmit or receive data, for a system according to an embodiment of the present disclosure, to or from one another through the network 400.

The network 400 according to embodiments of the present disclosure may use any of various types of wired communication systems such as a Public Switched Telephone Network (PSTN), an x Digital Subscriber Line (xDSL), a Rate Adaptive DSL (RADSL), a Multi-rate DSL (MDSL), a Very High Speed DSL (VDSL), a Universal Asymmetric DSL (UADSL), a High Bit Rate DSL (HDSL), and a local area network (LAN).

The network 400 described herein may further use any of various types of wireless communication systems such as Code Division Multi Access (CDMA), Time Division Multi Access (TDMA), Frequency Division Multi Access (FDMA), Orthogonal FDMA (OFDMA), Single Carrier-FDMA (SC-FDMA), and other systems.

The network 400 according to embodiments of the present disclosure may be configured with any type of communication, e.g., wired communication or wireless communication, and configured as any of various types of communication networks such as a personal area network (PAN) and a wide area network (WAN). In addition, the network 400 may be the well-known World Wide Web (WWW) and may use wireless transmission technology, e.g., Infrared Data Association (IrDA) or Bluetooth, used for short-range communication. Technologies described herein may be used not only in the networks described above but also in other networks.

According to an embodiment of the present disclosure, the server 100 that performs a method of performing registration between a plurality of images of different dimensions (hereinafter referred to as the "server 100") may perform registration between a plurality of images. In an embodiment, a plurality of images that are registration targets are images of different dimensions and may include, for example, a two-dimensional (2D) image and three-dimensional (3D) image. In a concrete embodiment, a 2D image may be a cephalo image obtained by X-raying a profile and a 3D image may be a CT image obtained by photographing an upper-and-lower jaw area.

In general, small volume CBCT, which is relatively inexpensive and generates less radiation exposure, is widely used in dental clinics. However, as shown in FIG. 4A, a small volume CBCT image is obtained by photographing only an upper-and-lower jaw area of a user and thus it may be difficult to check a degree to which this area warps. Specifically, whether the upper and lower jaws warp may be determined on the basis of a CT image of an entire face area with respect to a landmark of a specific part (e.g., the forehead), whereas a 3D image related to the upper and lower jaws has no reference point and does not provide information as to whether the upper and lower jaws warp. Accordingly, the server 100 of the present disclosure may extract a specific part of a 2D image obtained by X-raying a profile, generate a registration image by registration between the extracted part with a CT image related to the upper-and-lower jaw area, and position the registration image to check whether the upper and lower jaws warp. That is, the server 100 may perform registration between a 3D image 10 related to the upper and lower jaws and a 2D image 20 and position a result of the registration to provide a logical criterion for a diagnosis and analysis of the 3D image 10. The method of performing registration between a plurality of images of different dimensions will be described in detail with reference to FIG. 3 below.

Although FIG. 1 illustrates only one server 100 according to the embodiment, it will be apparent to those of ordinary skill in the art that more than one server falls within the scope of the present disclosure and the server 100 may include additional components. That is, the server 100 may include a plurality of computing devices. In other words, a set of nodes may constitute the server 100.

According to an embodiment of the present disclosure, the server 100 may be a server that provides a cloud computing service. More specifically, the server 100 may be a server that provides a cloud computing service for processing information using a computer connected to the Internet other than a user's computer, i.e., a type of Internet-based computing. The cloud computing service may be a service for storing data on the Internet and allowing a user to use desired data or a program regardless of time and place by connecting to the Internet without storing the desired data or program in the user's computer, and the data stored in the Internet can be easily shared and delivered through simple manipulation and clicking. In addition, the cloud computing service may be a service for allowing a desired task to be performed using functions of an application program provided on the Web without additionally installing a program and allowing several persons to perform a task at the same time while sharing a document, as well as simply storing data in a server on the Internet. The cloud computing service may be implemented as at least one of Infrastructure as a Service (IaaS), Platform as a Service (PaaS), Software as a Service (SaaS), a virtual machine-based cloud server, or a container-based cloud server. That is, the server 100 of the present disclosure may be implemented as at least one of the above-described cloud computing services. The above-described cloud computing services are only examples and may include a platform for constructing a cloud computing environment of the present disclosure.

The user terminal 200 according to the embodiment of the present disclosure may be understood as a type of node(s) in a system of a mechanism for communication with the server 100. The user terminal 200 is a terminal capable of being provided with registration image data corresponding to a plurality of pieces of image data of different dimensions through exchange of information with the server 100, and may be understood as a user's own terminal. For example, the user terminal 200 may be a terminal related to a user (e.g., a doctor) who desires to obtain diagnostic information through an image related to teeth.

In an embodiment, the user terminal 200 may be connected to the server 100 through the network 400, and may provide the server 100 with a plurality of pieces of image data (e.g., 2D image data and 3D image data) and receive registration image data in response to the provided image data.

The user terminal 200 may be understood as a type of entity(s) in a system of a mechanism for communication with the server 100. Examples of the user terminal 200 may include a personal computer (PC), a notebook computer, a mobile terminal, a smartphone, a tablet PC, a wearable device, etc., and include various types of devices capable of accessing a wired/wireless network. Examples of the user terminal 200 may include a server implemented by at least one of an agent, an application programming interface (API) or a plug-in. In addition, examples of the user terminal 200 may include an application source and/or a client application.

In an embodiment, the external server 300 may be connected to the server 100 through the network 400, and may provide the server 100 with various types of information/data required to perform a method of performing registration between a plurality of images of different dimensions or may receive, store, and manage resulting data obtained by performing the method of performing registration between a plurality of images of different dimensions. For example, the external server 300 may be a storage server provided separately outside the server 100 but is not limited thereto. A hardware configuration of the server 100 that performs a method of performing registration between a plurality of images of different dimensions will be described with reference to FIG. 2 below.

Figure 2:
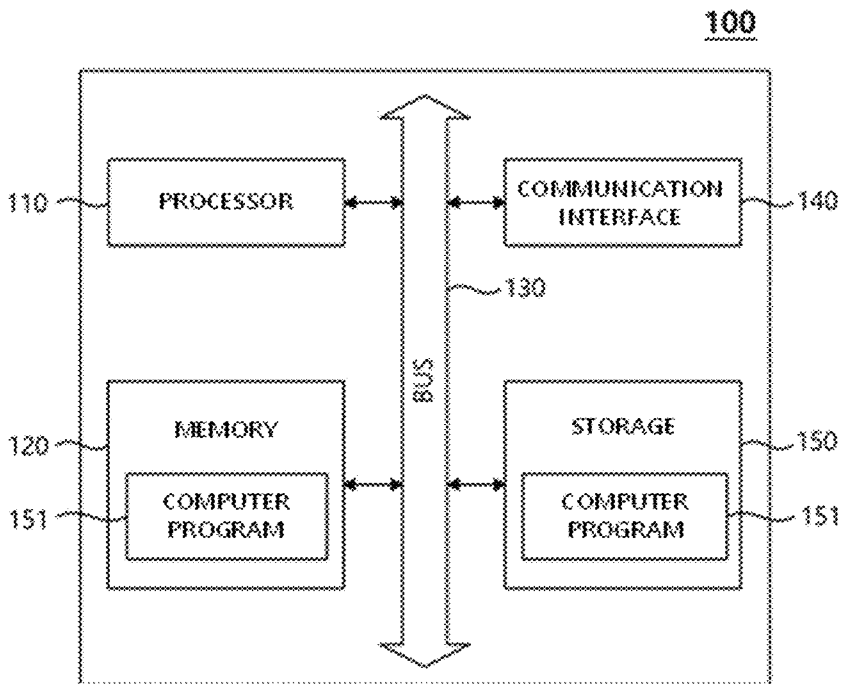
FIG. 2 is a diagram illustrating a hardware configuration of a server for performing a method of performing registration between a plurality of images of different dimensions according to an embodiment of the present disclosure.

FIG. 2 is a diagram illustrating a hardware configuration of a server for performing a method of performing registration between a plurality of images of different dimensions according to an embodiment of the present disclosure.

Referring to FIG. 2, a server 100 that performs a method of performing registration between a plurality of images of different dimensions according to an embodiment of the present disclosure may include one or more processors 110, a memory 120 configured to load therein a computer program 151 to be executed by the one or more processors 110, a bus 130, a communication interface 140, and a storage 150 storing the computer program 151. Here, FIG. 2 illustrates only components related to the embodiment of the present disclosure. Therefore, it will be apparent to those of ordinary skill in the art that other general-purpose components may be further provided in addition to the components illustrated in FIG. 2.

According to an embodiment of the present disclosure, the processor 110 may generally control overall operations of the server 100. The processor 110 may process signals, data, information, and the like that are input or output through the components described above or may execute an application program stored in the memory 120 to provide appropriate information or functions to a user or a user terminal or process the information or functions.

The processor 110 may perform an operation on at least one application or program for performing methods according to embodiments of the present disclosure, and the server 100 may include one or more processors.

According to an embodiment of the present disclosure, the processor 110 may include one or more cores, and include a processor for analyzing data and performing deep learning, e.g., a central processing unit (CPU), a general-purpose graphics processing unit (GPGPU) or a tensor processing unit (TPU).

The processor 110 may provide a method of performing registration between a plurality of images of different dimensions by reading a computer program stored in the memory 120, according to an embodiment of the present disclosure.

In various embodiments, the processor 110 may further include a random access memory (RAM) (not shown) and a read-only memory (ROM) (not shown) for temporarily and/or permanently storing signals (or data) processed in the processor 110. The at least one processor 110 may be embodied in the form of a system-on-chip (SoC) including at least one of a graphics processor, a RAM, and a ROM.

The memory 120 stores various types of data, instructions, and/or information. The memory 120 may load the computer program 151 from the storage 150 to execute a method/operation according to various embodiments of the present disclosure. When the computer program 151 is loaded in the memory 120, the processor 110 may execute one or more instructions constituting the computer program 151 to perform the method/operation. The memory 120 may be embodied as a volatile memory such as a RAM but the technical scope of the present disclosure is not limited thereto.

The bus 130 provides a communication function between the components of the server 100. The bus 130 may be embodied as any of various types of buses such as an address bus, a data bus, and a control bus.

The communication interface 140 supports wired/wireless Internet communication of the server 100. The communication interface 140 may also support various communication methods other than Internet communication. To this end, the communication interface 140 may include a communication module well known in the technical field of the present disclosure. In some embodiments, the communication interface 140 may be omitted.

The storage 150 may store the computer program 151 non-temporarily. When a process of performing registration between a plurality of images of different dimensions is performed through the server 100, the storage 150 may store various types of information required to provide this process.

The storage 150 may include a non-volatile memory, such as a ROM, an erasable programmable ROM (EPROM), an electrically erasable programmable ROM (EEPROM) or a flash memory, a hard disk, a detachable disk, or any type of computer-readable recording medium well known in the technical field to which the present disclosure pertains.

The computer program 151 may include one or more instructions causing the processor 110 to perform a method/operations according to various embodiments of the present disclosure when the computer program 151 is loaded in the memory 120. That is, the processor 110 may execute the one or more instructions to perform the method/operations according to various embodiments of the present disclosure.

In an embodiment, the computer program 151 may include one or more instructions for performing a method of performing registration between a plurality of images of different dimensions, the method including primarily positioning a 3D image by identifying a first landmark of the 3D image, generating a registration image by registration between the primarily positioned 3D image and a 2D image, and secondarily positioning the registration image.

The operations of the method or an algorithm described above in connection with embodiments of the present disclosure may be implemented directly by hardware, a software module executed by hardware, or a combination thereof. The software module may reside in a RAM, a ROM, an EPROM, an EEPROM, a flash memory, a hard disk, a removable disk, a CD-ROM, or a type of computer-readable recording medium well-known in the technical field to which the present disclosure pertains.

Components of the present disclosure may be embodied in the form of a program (or an application) and stored in a medium to be executed in combination with a computer which is hardware. The components of the present disclosure may be implemented by software programming or software elements, and similarly, embodiments may be implemented in a programming or scripting language such as C, C++, Java, or an assembler, including data structures, processes, routines, or various algorithms which are combinations of other programming components. Functional aspects may be embodied as an algorithm executable by one or more processors. A method of performing registration between a plurality of images of different dimensions performed by the server 100 will be described in detail with reference to FIGS. 3 to 12 below.

Figure 3:
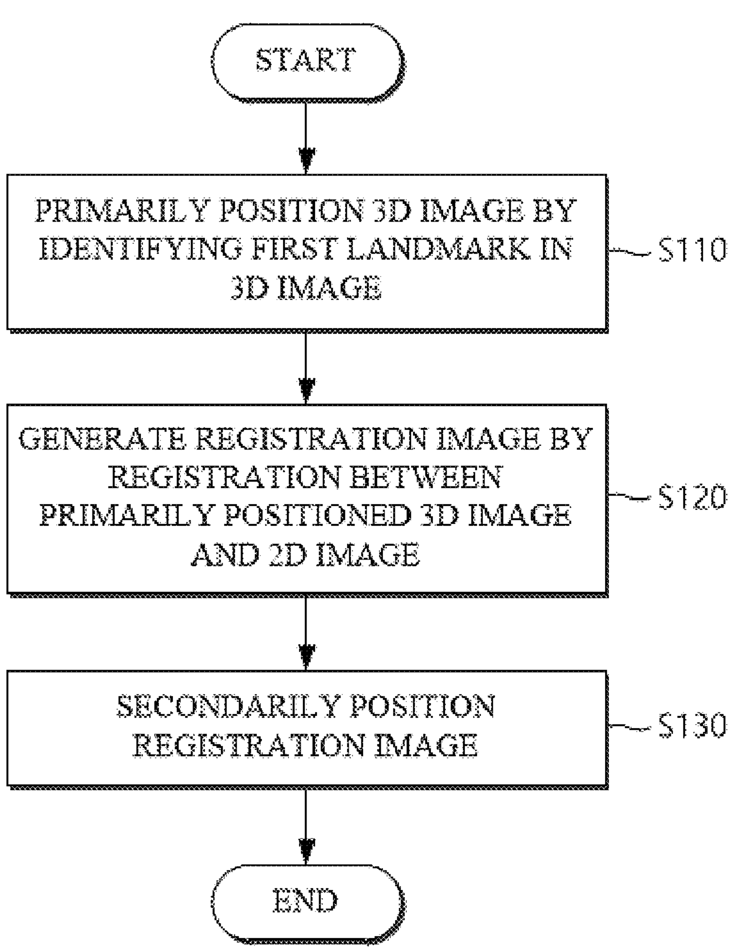
FIG. 3 is a flowchart of a method of performing registration between a plurality of images of different dimensions according to an embodiment of the present disclosure.
Figure 4:
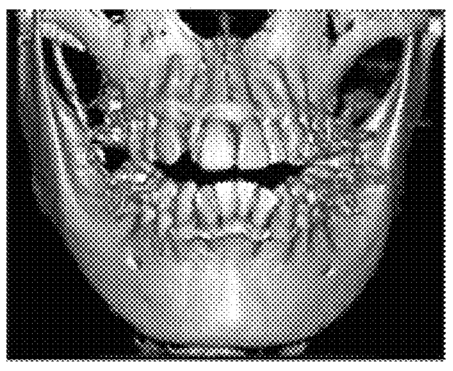
FIG. 4 is a diagram illustrating a three-dimensional (3D) image, a two-dimensional (2D) image, and a registration image according to an embodiment of the present disclosure.
Figure 4:
Figure 4:
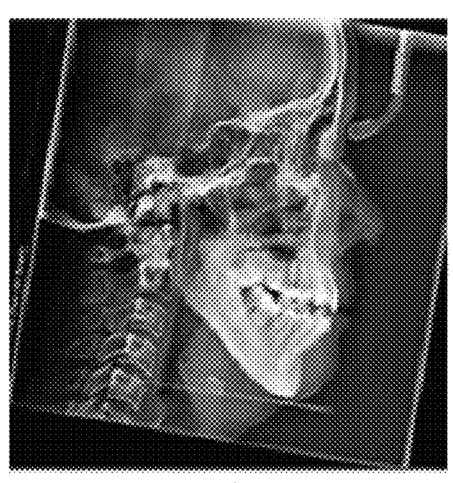

FIG. 3 is a flowchart of a method of performing registration between a plurality of images of different dimensions according to an embodiment of the present disclosure. An order of the operations illustrated in FIG. 3 may be changed as necessary and at least one operation may be omitted or added. That is, the operations to be described below are only examples of the present disclosure and the scope of the present disclosure is not limited thereto.

According to an embodiment of the present disclosure, the server 100 may primarily position a 3D image 10 by identifying a first landmark of the 3D image 10 (S110).

In an embodiment, the 3D image 10 may be a CT image obtained by photographing an upper-and-lower jaw area as shown in FIG. 4A. For example, the 3D image 10 may be a 3D image obtained by photographing only the upper and lower jaws below the head and thus does not provide anatomical information about an upper part of the head, and may be a 3D image in which photographing distortion has been corrected.

In an embodiment, the primary positioning of the 3D image may be performed to position the 3D image in a balanced manner. For example, the 3D image 10 is an image obtained by photographing a user's upper and lower jaws and the upper and lower jaw parts in the image may not be symmetrical in a horizontal or vertical direction according to the user's posture. For example, the left cheekbone may be higher than the right cheekbone. In this case, the upper and lower jaws may occlude appropriately but may look distorted according to the user's posture. Accordingly, when the 3D image 10 is acquired, the server 100 may primarily position the 3D image 10 to appropriately arrange the 3D image 10.

In an embodiment, the first landmark may include a first landmark A 11 and a first landmark B 12 that are related to left and right sides of the face, and a first landmark C 13 and a first landmark D 14 that are related to front and rear sides of the face. For example, the landmark of the present disclosure may be identified through an image recognition model or generated based on a user's input related to 2D and 3D images. Here, the image recognition model may be a neural network model trained to recognize a specific area (e.g., a landmark) of an image. In an embodiment, the server 100 of the present disclosure may provide the user terminal 200 with a user interface for setting a landmark, and a user of the user terminal 200 may set a landmark in relation to a specific area of the image using the user interface. The detailed description of the method of setting a landmark is only an example, and the present disclosure is not limited thereto.

Figure 5A:
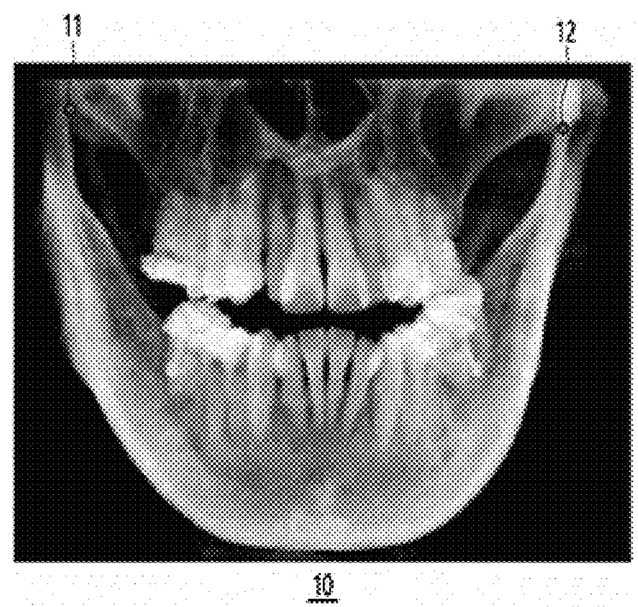
FIG. 5A is a diagram illustrating a first landmark according to an embodiment of the present disclosure.

Specifically, referring to FIG. 5A, the first landmark A 11 and the first landmark B 12 may be located in relation to both cheekbones, i.e., the left and right cheekbones. More specifically, the first landmark A 11 and the first landmark B 12 may relate to a point, i.e., a key ridge point (KRP), on a boundary between the cheekbone and the upper jawbone and thus may relate to the left and right parts of the upper jawbone, respectively.

Figure 5B:
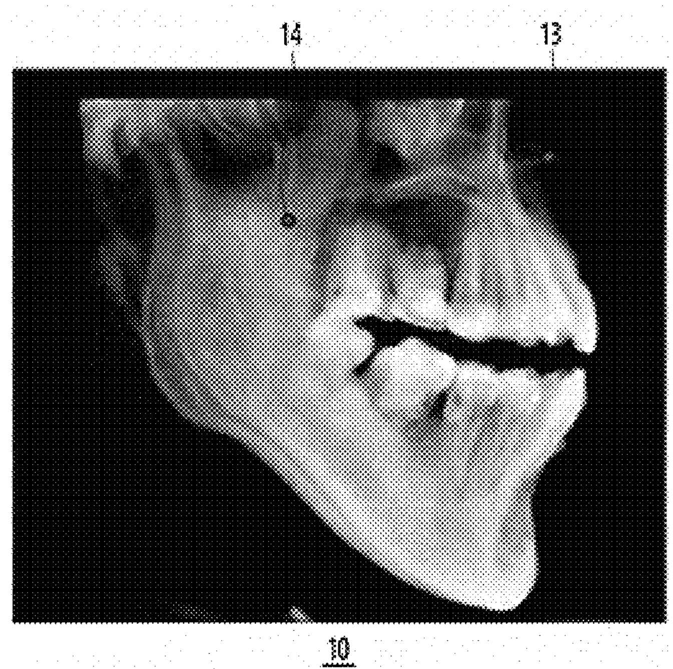
FIG. 5B is a diagram illustrating a first landmark according to an embodiment of the present disclosure.

Referring to FIG. 5B, the first landmark C 13 and the first landmark D 14 may be located in relation to a front end and a rear end of the upper jaw bone. In a concrete embodiment, the first landmark C 13 may be a point related to the anterior nasal spine (ANS), and the first landmark D 14 may be a point related to the posterior nasal spine (PNS).

According to an embodiment, the primary positioning of the 3D image 10 may include rotating the 3D image 10 about the first landmark C 13 on a y-axis to match z-coordinates of the first landmark A 11 and the first landmark B 12, and rotating the 3D image 10 about the first landmark C 13 on a z-axis to match y-coordinates of the first landmark A 11 and the first landmark B 12. That is, the server 100 may appropriately arrange the 3D image 10 not to be biased in a specific direction.

Figure 6A:
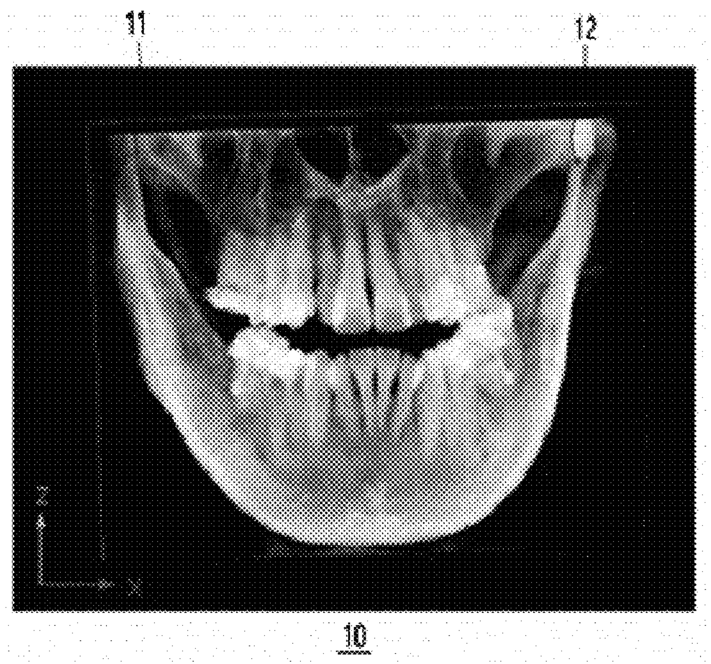
FIG. 6A is a diagram illustrating a process of performing primary positioning according to an embodiment of the present disclosure.
Figure 6B:
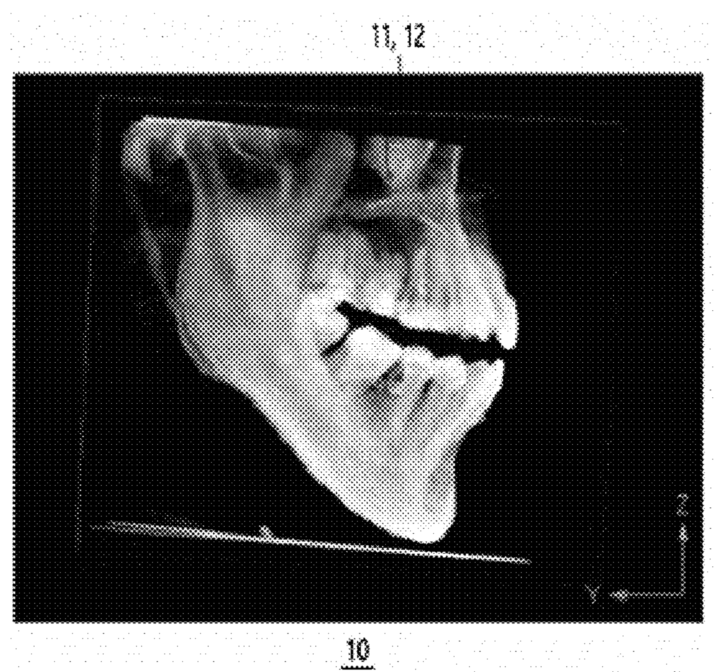
FIG. 6B is a diagram illustrating a process of performing primary positioning according to an embodiment of the present disclosure.

More specifically, referring to FIGS. 6A and 6B, a plane related to x and z axes may be a plane related to a user's foreface, and a plane related toy and z axes may be a plane related to the user's profile. During photographing, the positions of left and right sides or front and rear sides of the user's face may be distorted according to the user's posture. For example, the first landmark B 12 may be lower than the first landmark A 11 as shown in FIG. 5A or the first landmark C 13 may be located at a position higher than the first landmark D 14 as shown in FIG. 5B. That is, the user's face may be photographed in a state in which the user's left cheekbone (e.g., a part corresponding to the first landmark B) is lowered and the user's head is slightly lifted. Accordingly, the server 100 may perform primary positioning such that the image is balanced.

That is, the server 100 may perform y-axis rotation about the first landmark C 13 to match z-coordinates of the first landmark A 11 and the first landmark B 12, and perform z-axis rotation about the first landmark C 13 to match y-coordinates of the first landmark A 11 and the first landmark B 12.

Specifically, y-axis rotation may be rotated about the first landmark C 13 such that the z-coordinate of the first landmark A 11 and the z-coordinate of the first landmark B 12 may be the same (i.e., the heights of the first landmark A 11 and the first landmark B 12 in a z-axis direction may be the same). The y-axis rotation $R_y(\theta_y)$ may be performed using the following equation.

When a rotation angle is $\theta_y$ and the z-coordinate of the first landmark A 11 is greater than the z-coordinate of the first landmark B 1, $\theta_y<0$.

$$R_y(\theta_y) = \begin{bmatrix} 1 & 0 & 0 & x_c \\ 0 & 1 & 0 & y_c \\ 0 & 0 & 1 & z_c \\ 0 & 0 & 0 & 1 \end{bmatrix} \begin{bmatrix} \cos\theta_y & 0 & \sin\theta_y & 0 \\ 0 & 1 & 0 & 0 \\ -\sin\theta_y & 0 & \cos\theta_y & 0 \\ 0 & 0 & 0 & 1 \end{bmatrix} \begin{bmatrix} 1 & 0 & 0 & -x_c \\ 0 & 1 & 0 & -y_c \\ 0 & 0 & 1 & -z_c \\ 0 & 0 & 0 & 1 \end{bmatrix}$$

c=first landmark C

In addition, z-axis rotation may be performed about the first landmark C 13 such that the y-coordinate of the first landmark A 11 and the y-coordinate of the first landmark B 12 may be the same (i.e., an interval between the front and the back of the first landmark A 11 and an interval between the front and the back of the first landmark B 12 in a y-axis direction may be the same). The z-axis rotation $R_z(\theta_z)$ may be performed using the following equation.

When a rotation angle is $\theta_z$ and the y-coordinate of the first landmark A 11 is less than the y-coordinate of the first landmark B 12, $\theta_z<0$.

$$R_z(\theta_z) = \begin{bmatrix} 1 & 0 & 0 & x_c \\ 0 & 1 & 0 & y_c \\ 0 & 0 & 1 & z_c \\ 0 & 0 & 0 & 1 \end{bmatrix} \begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix} \begin{bmatrix} 1 & 0 & 0 & -x_c \\ 0 & 1 & 0 & -y_c \\ 0 & 0 & 1 & -z_c \\ 0 & 0 & 0 & 1 \end{bmatrix}$$

c=first landmark C

As described above, when z-axis rotation and y-axis rotation are performed about the first landmark C 13 such that z-coordinates and y-coordinates of the first landmark A 11 and the first landmark B 12 are the same, heights (i.e., the z-coordinates) of the first landmark A 11 and the first landmark B 12 in a forward direction may be the same, and front and rear orientations (i.e., the y-coordinates) of the first landmark A 11 and the first landmark B 12 in a lateral direction may be the same as shown in FIG. 6A. That is, primary positioning may be performed such that z and y coordinates between the first landmark A 11 and the first landmark B 12 are the same.

According to an embodiment of the present disclosure, the server 100 may perform generating a registration image by registration between the primarily positioned 3D image 10 and the 2D image 20 (S120).

In an embodiment, the server 100 may perform control such that directions of the head and the face in the 3D image 10 match those in the 2D image 20. The server 100 may match directions of the head and the face in the 3D image 10 with those of the head and the face in the 2D image 20 by causing the head and the face in the 3D image 10 to be oriented in a positive z-axis direction and a negative y-axis direction, respectively.

Figure 7:
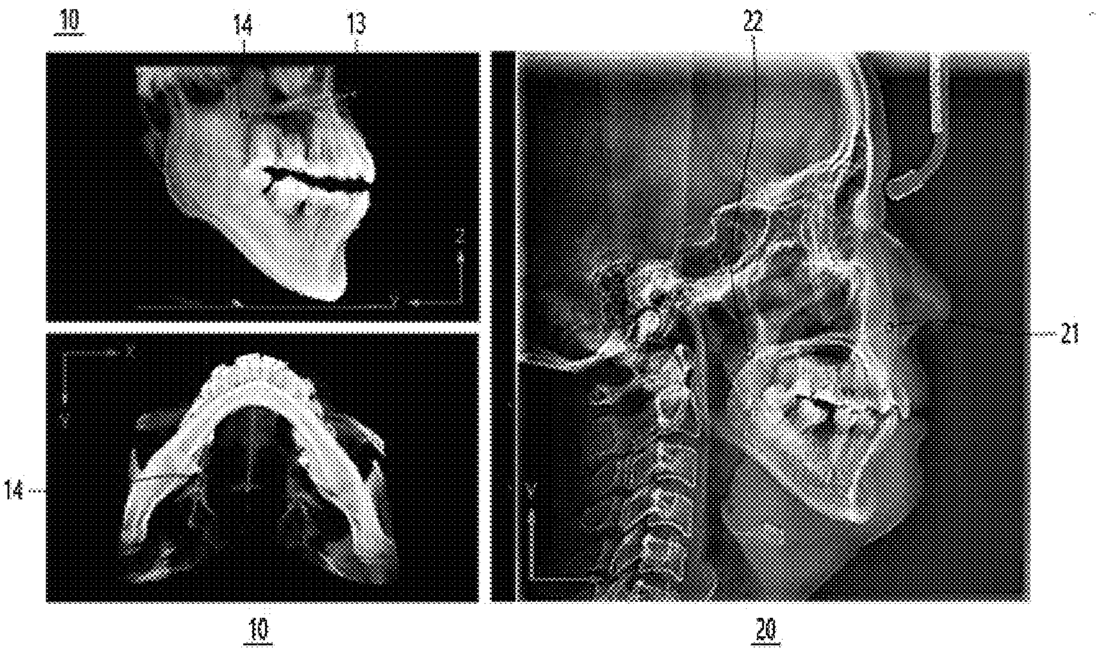
FIG. 7 is a diagram illustrating a landmark of a 3D image and a landmark of a 2D image according to an embodiment of the present disclosure.

More specifically, referring to FIG. 7, the server 100 may transform an axis of coordinates of the 3D image 10 from an x-y plane to a y-z plane to align directions of the faces in the 3D image 10 and the 2D image 20 in a 3D space. That is, the server 100 may position the face in the 3D image 10 to be oriented in a lateral direction.

Figure 8A:
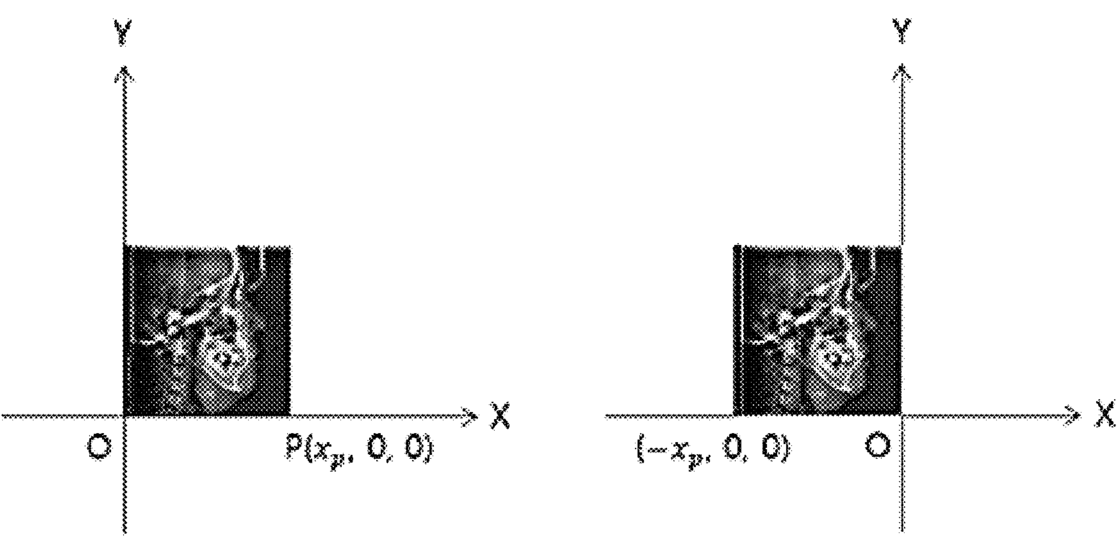
FIG. 8A is a diagram illustrating transformation of coordinates of a 2D image according to an embodiment of the present disclosure.

In an embodiment, the server 100 may perform parallel translation of the 2D image 20 toward the x-axis such that when a point on the x-axis corresponding to a maximum x-axis coordinate of the 2D image 20 is $P(x_p, 0, 0)$, $P(x_p, 0, 0)$ may be an origin. That is, as illustrated in FIG. 8A, the parallel translation toward the x-axis may be performed such that a maximum point on the 2D image 20 becomes the origin. The parallel translation toward the x-axis $T_p$ may be expressed by the following equation:

$$T_p = \begin{bmatrix} 1 & 0 & 0 & -x_p \\ 0 & 1 & 0 & 0 \\ 0 & 0 & 1 & 0 \\ 0 & 0 & 0 & 1 \end{bmatrix}$$

Figure 8B:
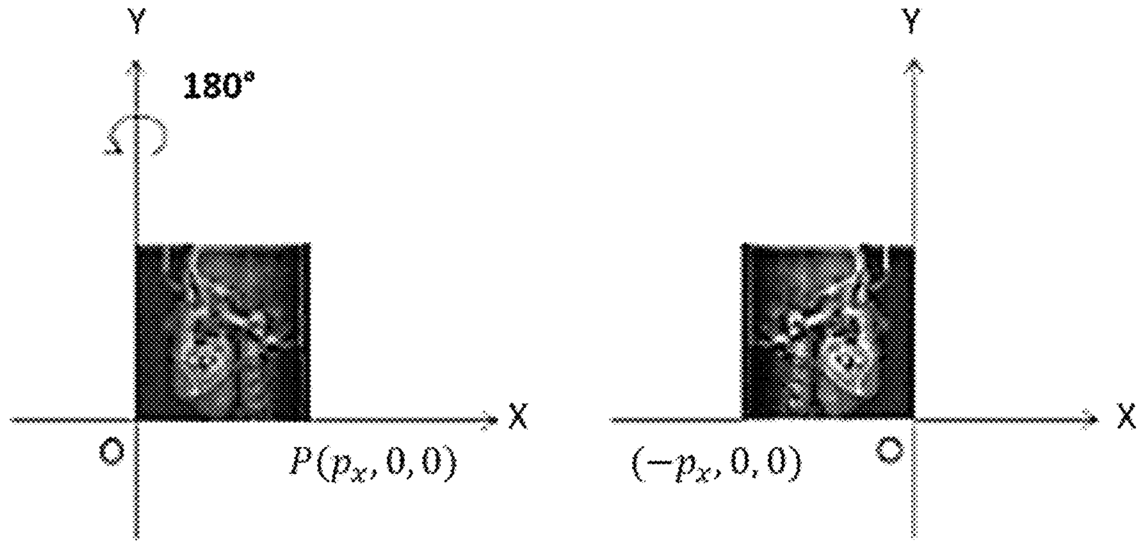
FIG. 8B is a diagram illustrating transformation of coordinates of a 2D image according to an embodiment of the present disclosure.

According to an embodiment, when the 2D image 20 is a left sagittal image (i.e., an image obtained by photographing a left side of the face) as shown in FIG. 8B, 180-degree rotation may be performed on the y-axis. The 180-degree rotation about the y-axis $R_y(\pi)$ may be expressed by the following equation:

$$R_y(\pi) = \begin{bmatrix} -1 & 0 & 0 & 0 \\ 0 & 1 & 0 & 0 \\ 0 & 0 & -1 & 0 \\ 0 & 0 & 0 & 1 \end{bmatrix}$$

Figure 9A:
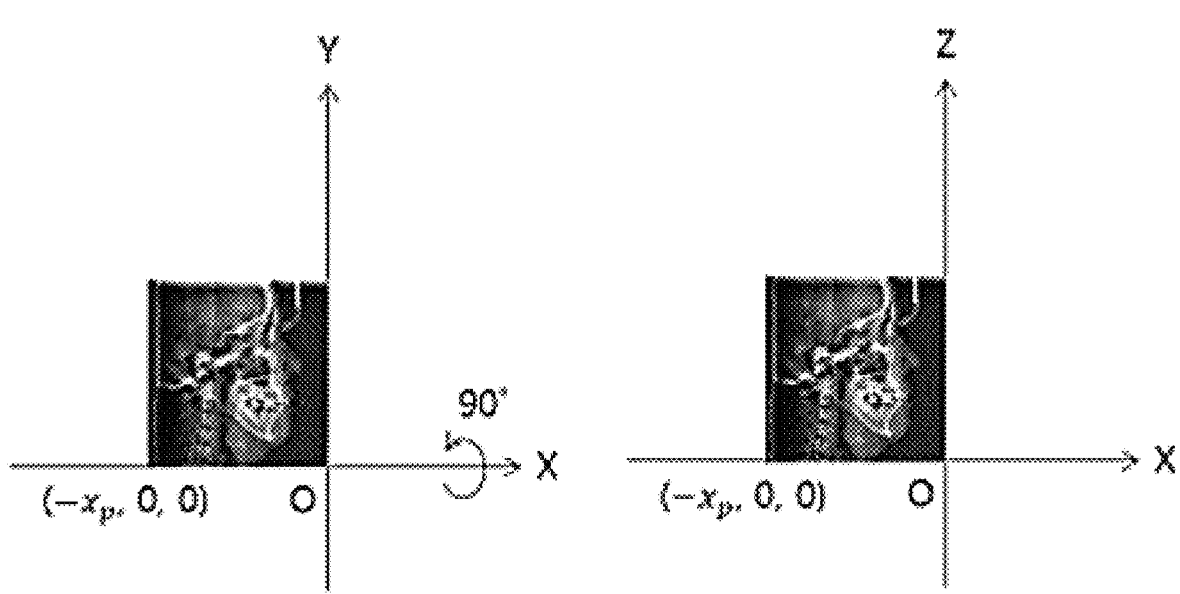
FIG. 9A is a diagram illustrating transformation of coordinates of a 2D image according to an embodiment of the present disclosure.

According to an embodiment, the server 100 may rotate the 2D image 20 90 degrees about the x-axis such that the head in the 2D image 20 faces the z-axis. That is, as shown in FIG. 9A, the head in the 2D image 20 may be brought to face the z-axis by rotating the 2D image 20 90 degrees about the x-axis. The 90-degree rotation about the x-axis $$R_x\left(\frac{\pi}{2}\right)$$

may be expressed by the following equation:

$$R_x\left(\frac{\pi}{2}\right)=\begin{bmatrix}1&0&0&0\\0&0&-1&0\\0&1&0&0\\0&0&0&1\end{bmatrix}$$

Figure 9B:
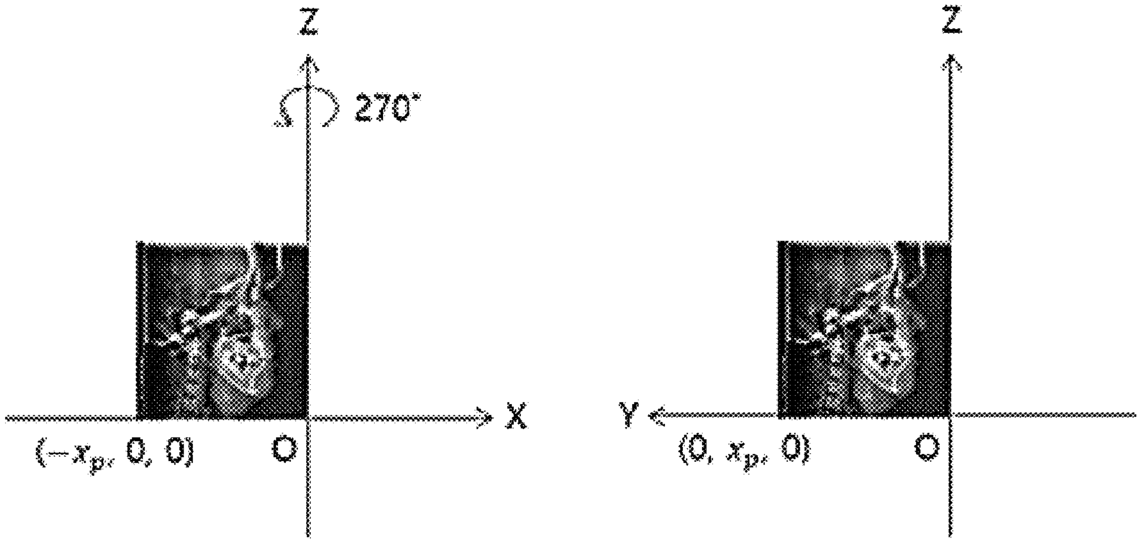
FIG. 9B is a diagram illustrating transformation of coordinates of a 2D image according to an embodiment of the present disclosure.
Figure 10:
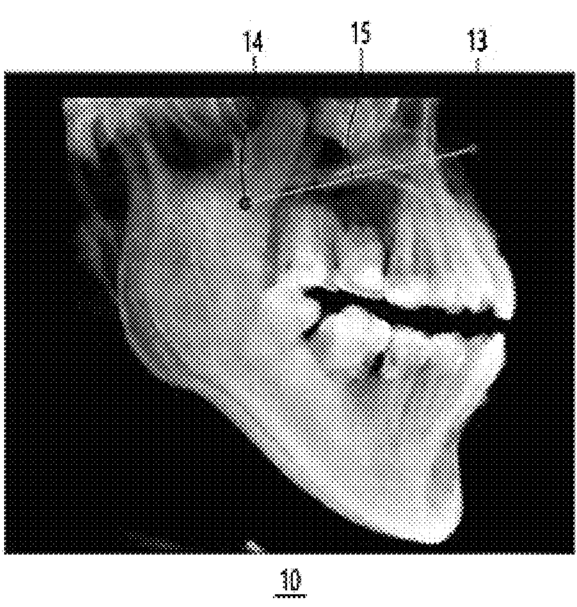
FIG. 10 is a diagram illustrating a process of generating a registration image according to an embodiment of the present disclosure.
Figure 10:
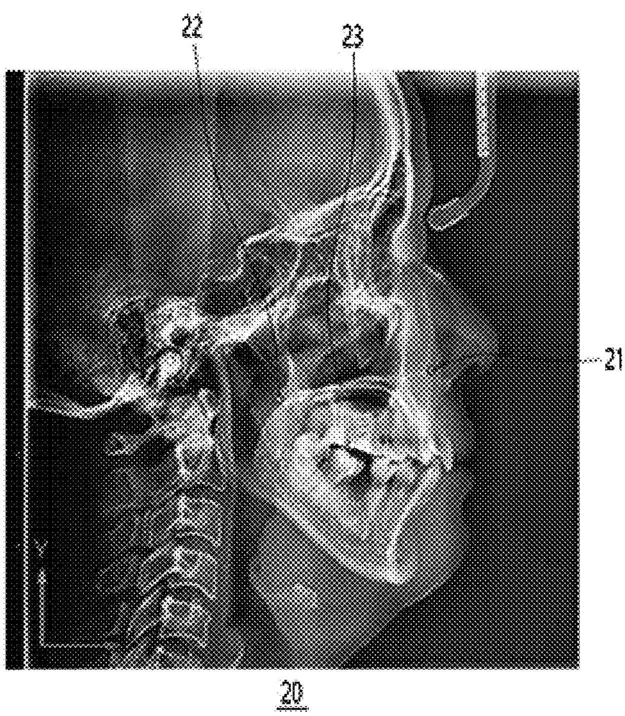

In an embodiment, the server 100 may rotate the 2D image 20 270 degrees about the z-axis such that an occipital part in the 2D image 20 faces the y-axis. That is, as shown in FIG. 9B, the 2D image 20 is rotated by 270 degrees about the z-axis to cause the occipital part in the 2D image 20 to face the y-axis. The 90-degree rotation about the x-axis $$R_z\left(\frac{3\pi}{2}\right)$$

may be expressed by the following equation:

$$R_z\left(\frac{3\pi}{2}\right)=\begin{bmatrix}0&1&0&0\\-1&0&0&0\\0&0&1&0\\0&0&0&1\end{bmatrix}$$

That is, transformation of the axis of coordinates of the 2D image 20 $M_1$ may be expressed by:

$$M_1=R_z\left(\frac{3\pi}{2}\right)R_x\left(\frac{\pi}{2}\right)T_p=\begin{bmatrix}0&1&0&0\\-1&0&0&0\\0&0&1&0\\0&0&0&1\end{bmatrix}\begin{bmatrix}1&0&0&0\\0&0&-1&0\\0&1&0&0\\0&0&0&1\end{bmatrix}\begin{bmatrix}1&0&0&-x_p\\0&1&0&0\\0&0&1&0\\0&0&0&1\end{bmatrix}=\begin{bmatrix}0&0&-1&0\\-1&0&0&x_p\\0&1&0&0\\0&0&0&1\end{bmatrix}$$

In another embodiment, when the 2D image 20 is a left sagittal image (i.e., an image obtained by photographing a left side of the face) as shown in FIG. 8B, the transformation $M_1$ of the axis of coordinates may be expressed by:

$$M_1=R_z\left(\frac{3\pi}{2}\right)R_x\left(\frac{\pi}{2}\right)T_p=\begin{bmatrix}0&1&0&0\\-1&0&0&0\\0&0&1&0\\0&0&0&1\end{bmatrix}\begin{bmatrix}1&0&0&0\\0&0&-1&0\\0&1&0&0\\0&0&0&1\end{bmatrix}\begin{bmatrix}-1&0&0&0\\0&1&0&0\\0&0&-1&0\\0&0&0&1\end{bmatrix}=\begin{bmatrix}0&0&1&0\\1&0&0&0\\0&1&0&0\\0&0&0&1\end{bmatrix}$$

As described above, the server 100 may match directions of the face and the head in the 2D image 20 with those of the face and the head in the 3D image 10 by performing parallel movement on the x-axis (performing rotation by 180 degrees about the y-axis when the 2D image 20 is a left sagittal image in another embodiment) such that a point P on the x-axis corresponding to maximum axial coordinates for the 2D image 20 becomes an origin, rotating the 2D image 20 90 degrees about the x-axis such that the head faces the z-axis, and rotating the 2D image 20 270 degrees about the z-axis such that the occipital part faces the y-axis.

According to an embodiment, the server 100 may convert a size of the 2D image 20 on the basis of a first landmark in the 3D image 10 and a second landmark in the 2D image. In an embodiment, referring to the 2D image 20 of FIG. 7, the second landmark is related to front and rear sides of the face, and may include a second landmark A 21 and a second landmark B 22 that are respectively related to front and rear ends of the upper jawbone. In a concrete embodiment, the second landmark A 21 may be a point related to the ANS, and the second landmark B 22 may be a point related to the PNS. More specifically, referring to FIG. 10, the server 100 may identify a first straight line 15 between a first landmark C 13 and a first landmark D 14 in a 3D image 10. The server 100 may also identify a second straight line 23 between a second landmark A 21 and a second landmark B 22 in a 2D image 20.

In addition, the server 100 may obtain a size conversion ratio on the basis of the first straight line 15 and the second straight line 23, and may convert a size of the 2D image 20 on the basis of the obtained size conversion ratio.

For example, when the first straight line 15 is 8 cm and the second straight line 23 is 16 cm, the server 100 may obtain a size conversion ratio of 1/2 and reduce the size of the 2D image 20 to a half on the basis of the size conversion ratio of 1/2. The size conversion ratio and the values described above related to size conversion are only examples and thus the present disclosure is not limited thereto.

A matrix S related to a change of a ratio of the 2D image 20 may be expressed by:

$$S(s)=\begin{bmatrix}s&0&0&0\\0&s&0&0\\0&0&s&0\\0&0&0&1\end{bmatrix}$$

Here, s may denote a rate of change.

That is, the second landmark A 21 and the second landmark B 22 in the 2D image to which conversion of an axis of coordinates and a rate of change are applied may be expressed by the following equation:

$$\begin{bmatrix}x_A\\y_A\\z_A\\1\end{bmatrix}=\begin{bmatrix}s&0&0&0\\0&s&0&0\\0&0&s&0\\0&0&0&1\end{bmatrix}\begin{bmatrix}0&0&-1&0\\-1&0&0&x_p\\0&1&0&0\\0&0&0&1\end{bmatrix}\begin{bmatrix}x_a\\y_a\\z_a\\1\end{bmatrix}$$

Here, $x_a$, $y_a$, and $z_a$ may be coordinates related to the second landmark A before the change of the ratio of the 2D image 20, and $x_A$, $y_A$, and $z_A$ may be coordinates related to the second landmark A after the change of the ratio of the 2D image 20.

$$\begin{bmatrix}x_B\\y_B\\z_B\\1\end{bmatrix}=\begin{bmatrix}s&0&0&0\\0&s&0&0\\0&0&s&0\\0&0&0&1\end{bmatrix}\begin{bmatrix}0&0&-1&0\\-1&0&0&x_p\\0&1&0&0\\0&0&0&1\end{bmatrix}\begin{bmatrix}x_b\\y_b\\z_b\\1\end{bmatrix}$$

Here, $x_b$, $y_b$, and $z_b$ may be coordinates related to the second landmark B before the change of the ratio of the 2D image 20, and $x_B$, $y_B$, and $z_B$ may be coordinates related to the second landmark B after the change of the ratio of the 2D image 20.

In another embodiment, when the 2D image 20 is a left sagittal image as shown in FIG. 8B, the second landmark A 21 and the second landmark B 22 in the 2D image 20 to which the conversion of the axis of coordinates and the rate of change are applied may be expressed by the following equation:

$$\begin{bmatrix} x_A \\ y_A \\ z_A \\ 1 \end{bmatrix} = \begin{bmatrix} s & 0 & 0 & 0 \\ 0 & s & 0 & 0 \\ 0 & 0 & s & 0 \\ 0 & 0 & 0 & 1 \end{bmatrix} \begin{bmatrix} 0 & 0 & 1 & 0 \\ 1 & 0 & 0 & 0 \\ 0 & 1 & 0 & 0 \\ 0 & 0 & 0 & 1 \end{bmatrix} \begin{bmatrix} x_a \\ y_a \\ z_a \\ 1 \end{bmatrix}$$

Here, $x_a$, $y_a$, and $z_a$ may be coordinates related to the second landmark A before the change of the ratio of the 2D image 20, and $x_A$, $y_A$, and $z_A$ may be coordinates related to the second landmark A after the change of the ratio of the 2D image 20.

$$\begin{bmatrix} x_B \\ y_B \\ z_B \\ 1 \end{bmatrix} = \begin{bmatrix} s & 0 & 0 & 0 \\ 0 & s & 0 & 0 \\ 0 & 0 & s & 0 \\ 0 & 0 & 0 & 1 \end{bmatrix} \begin{bmatrix} 0 & 0 & 1 & 0 \\ 1 & 0 & 0 & 0 \\ 0 & 1 & 0 & 0 \\ 0 & 0 & 0 & 1 \end{bmatrix} \begin{bmatrix} x_b \\ y_b \\ z_b \\ 1 \end{bmatrix}$$

Here, $x_b$, $y_b$, and $z_b$ may be coordinates of the second landmark B before the change of the ratio of the 2D image 20, and $x_B$, $y_B$, and $z_B$ may be coordinates of the second landmark B after the change of the ratio of the 2D image 20.

That is, the server 100 may obtain a size conversion ratio of an image by identifying a distance ratio between the same landmarks in images through the above-described process, and convert a size of the image on the basis of the size conversion ratio.

According to an embodiment, the server 100 may overlap the 3D image 10 and the 2D image 20 with each other by moving the size-converted 2D image 20 on the basis of coordinates of a first landmark on the 3D image 10. The server 100 may convert the 2D image 20 and a second landmark on the basis of the 3D image 10 and the first landmark.

Specifically, the server 100 may move the size-converted 2D image 20 such that the coordinates of the second landmark A 21 on the 2D image 20 match those of the first landmark C 13.

In addition, the server 100 may rotate the 2D image 20 about the x-axis such that the first straight line 15 connecting the first landmark C 13 and the first landmark D 14 on the 3D image 10 overlap the second straight line 23 connecting the second landmark A 21 and the second landmark B 22 on the 2D image 20. That is, the server 100 may generate a registration image 30 by performing x-axis rotation such that the first straight line 15 and the second straight line 23 overlap each other. The generated registration image 30 may be generated by matching directions and sizes of the face and the head in the 3D image 10 with those of the face and the head in the 2D image 20 and performing registration between resultant images in the same area on the basis of a landmark.

According to an embodiment of the present disclosure, the server 100 may secondarily position the registration image 30 (S130). In an embodiment, the secondary positioning of the registration image 30 may be performed to arrange the registration image 30 so as to facilitate an analysis of the registration image 30. The server 100 may secondarily position the registration image 30 on the basis of a third landmark on the registration image 30.

Figure 11:
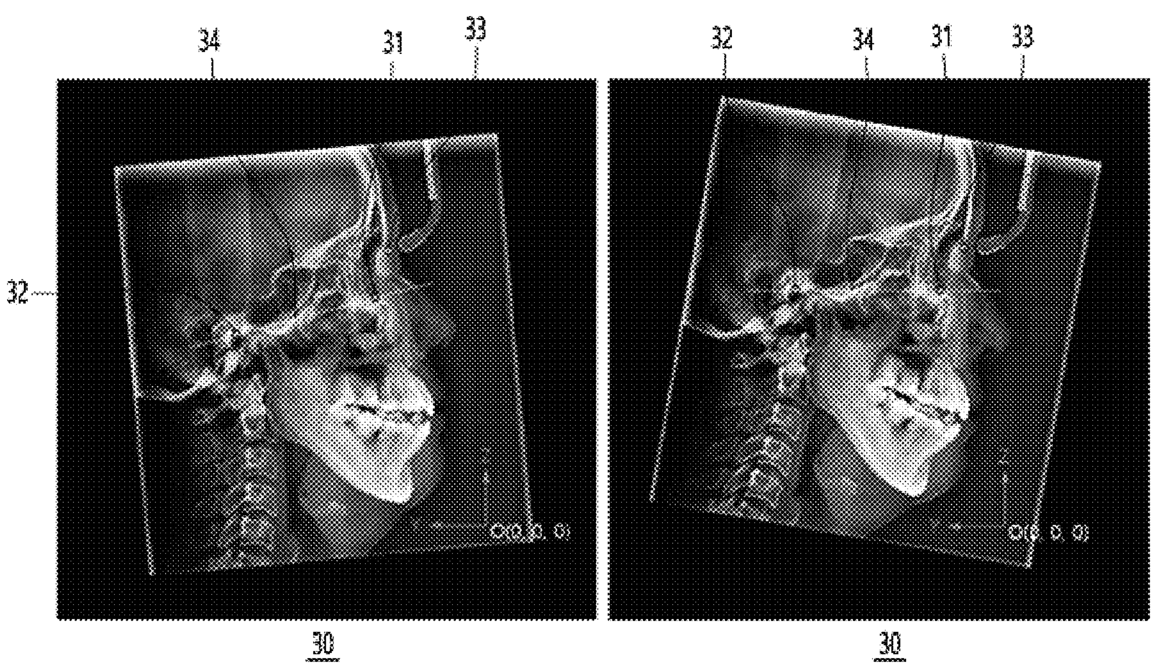
FIG. 11 is a diagram illustrating a process of performing secondary positioning according to an embodiment of the present disclosure.

Referring to FIG. 11, the third landmark may include a third landmark A 31 related to an orbitale, a third landmark B 32 related to a porion, and a third landmark C 33 related to a nasion. In an embodiment, the third landmark A 31 may relate to the orbitale, i.e., an area under the eye, the third landmark B 32 may relate to the porion, i.e., the point on the human skull located at the upper margin of each ear canal, and the third landmark C 33 may relate to the nasion, i.e., a craniometric point at which the top of the nose meets the ridge of the forehead.

Specifically, the server 100 may perform rotation about the x-axis such that a first line 34 connecting the third landmark A 31 and the third landmark B 32 is parallel to the y-axis. As shown in FIG. 11A, the first line 34 is not parallel to the y-axis but may become parallel to the y-axis through rotation about the x-axis, which is performed by the server 100, as shown in FIG. 11B.

Figure 12A:
FIG. 12A is a diagram illustrating a process of performing secondary positioning according to an embodiment of the present disclosure.

In addition, the server 100 may perform parallel translation on the registration image 30 such that the third landmark C 33 on the rotated registration image 30 becomes an origin. For example, in FIG. 12A, the origin is located outside the third landmark C 33 but may become the origin through parallel translation performed by the server 100 as shown in FIG. 12A.

Figure 12B:
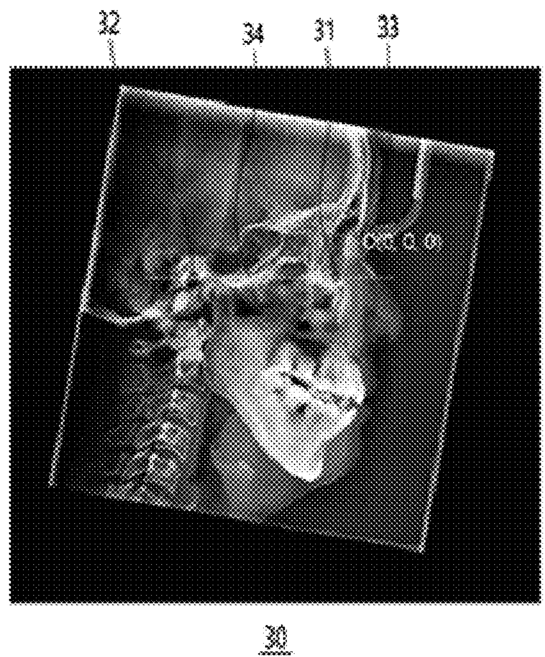
FIG. 12B is a diagram illustrating a process of performing secondary positioning according to an embodiment of the present disclosure.

As described above, the server 100 may position (i.e., primarily position) an image (e.g., a 3D image) to facilitate registration, perform registration between the positioned image and another image (e.g., a 2D image) by transforming coordinates of the other image in the same direction and size on the basis of the positioned image, and position (secondarily position) a resultant registration image (i.e., a registration image) for easy analysis. Here, as shown in FIGS. 12A and 12B, the registration image is an image generated by registration between a 3D image related to the upper and lower jaws and a 2D image and thus may provide a logical criterion for various diagnoses and analyses. For example, the registration image may provide information about a degree of warpage of the upper and lower jaws and the like, which cannot be identified only from the 3D image 10 obtained in relation to the upper and lower jaws, and help make a medical judgment regarding surgery and other procedures.

The operations of the methods or algorithm described above in connection with embodiments of the present disclosure may be implemented directly by hardware, a software module executed by hardware, or a combination thereof. The software module may reside in a RAM, a ROM, an EPROM, an EEPROM, a flash memory, a hard disk, a removable disk, a CD-ROM, or a type of computer-readable recording medium well-known in the technical field to which the present disclosure pertains.

Components of the present disclosure may be embodied in the form of a program (or an application) and stored in a medium to be executed in combination with a computer which is hardware. The components of the present disclosure may be implemented by software programming or software elements, and similarly, embodiments may be implemented in a programming or scripting language such as C, C++, Java, or an assembler, including data structures, processes, routines, or various algorithms which are combinations of other programming components. Functional aspects may be embodied as an algorithm executable by one or more processors.

It will be understood by those of ordinary skill in the art that various types of logic blocks, modules, processors, means, circuits, and operations of algorithms described above as examples in relation to the embodiments set forth herein are implementable using electronic hardware, various types of programs or design codes (referred to as "software"

herein for convenience of description), or a combination thereof. To clearly describe the interoperability between hardware and software, various types of components, blocks, modules, circuits, and operations have been generally described above as examples in relation to functions thereof. Whether such functions are implemented as hardware or software depends on a specific application and design restrictions imposed on the entire system. Functions described above in various ways with respect to each specific application can be implemented by those of ordinary skill in the art but decisions of the implementation should not be understood as exceeding the scope of the present disclosure.

The various embodiments set forth herein may be implemented as articles manufactured by methods, apparatuses, or standard programming and/or engineering techniques. The term "manufactured article" should be understood to include a computer program, a carrier or media accessible by any computer-readable device. Examples of a computer-readable medium may include, but are not limited to, magnetic storage devices (e.g., a hard disk, a floppy disk, a magnetic strip, etc.), optical discs (e.g., a CD, a DVD, etc.), smart cards, and flash memory devices (e.g., an EEPROM, a card, a stick, a key drive, etc.). In addition, the various types of storage media presented herein include one or more devices for storing information and/or other mechanical-readable media. The term "machine-readable media" includes, but is not limited to, wireless channels and various other media for storing, retaining, and/or transmitting instruction(s) and/or data.

It should be understood that the specific order or hierarchy of steps in the presented processes is an example of an exemplary approach. It should be understood that a specific order or hierarchical structure of operations of a process within the scope of the present disclosure may be rearranged on the basis of design priorities. The appended method claims provide elements of various operations in a sample order but should not be understood as being limited to the specific order or hierarchical structure presented herein.

A description of embodiments set forth herein is provided to help those of ordinary skill in the art use or implement the present disclosure. It will be obvious to those of ordinary skill in the technical field of the present disclosure that various modifications may be made in these embodiments, and the general principles defined herein may be applied to other embodiments without departing from the scope of the present disclosure. Therefore, the present disclosure is not limited to the embodiments set forth herein and should be understood as falling within the widest range consistent with the principles and novel features presented herein.

According to various embodiments of the present disclosure, it is possible to provide a logical criterion for diagnosis and analysis of a 3D image related to the upper and lower jaws through registration between the 3D image and a 2D image (e.g., an X-ray cephalo image).

Effects of the present disclosure are not limited thereto and other effects that are not described herein will be apparent to those of ordinary skill in the art from the following description.

What is claimed is:

1. A method of performing registration between a plurality of images of different dimensions by one or more processors of a computing device, the method comprising:

primarily positioning a three-dimensional (3D) image in a 3D space having x-axis, y-axis, and z-axis, by identifying a first landmark in the 3D image;

generating a registration image by registration between the primarily positioned 3D image and a two-dimensional (2D) image; and secondarily positioning the registration image, wherein the first landmark comprises a first landmark (A), a first landmark (B), a first landmark (C), and a first landmark (D), wherein the first landmark (A) and the first landmark (B) are related to left and right sides of a face, wherein the first landmark (C) and the first landmark (D) are related to front and rear sides of the face, wherein the primarily positioning of the 3D image comprises:

performing y-axis rotation about the first landmark (C) to match a z-coordinate of the first landmark (A) with a z-coordinate of the first landmark (B); and performing z-axis rotation about the first landmark (C) to match a y-coordinate of the first landmark (A) with a y-coordinate of the first landmark (B), wherein the generating of the registration image comprises:

matching directions of a head and the face in the 3D image with those of the head and the face in the 2D image;

converting a size of the 2D image on the basis of the first landmark in the 3D image and a second landmark in the 2D image; and overlapping the 3D image and the 2D image by moving the size-converted 2D image on the basis of coordinates of the first landmark in the 3D image, wherein the second landmark comprises a second landmark (A) and a second landmark (B) related to the front and rear sides of the face, and wherein the overlapping of the 3D image and the 2D image comprises:

moving the size-converted 2D image to match coordinates of the second landmark (A) with the coordinates of the first landmark (C); and overlapping the 2D image with the 3D image so that a second straight line connecting the second landmark (A) and the second landmark (B) in the 2D image is connected and aligned with a first straight line connecting the first landmark (C) and the first landmark (D) in the 3D image, wherein the converting of the size of the 2D image comprises:

identifying the first straight line connecting the first landmark (C) and the first landmark (D) in the 3D image;

identifying the second straight line connecting the second landmark (A) and the second landmark (B) in the 2D image; and obtaining a size conversion ratio on the basis of the first straight line and the second straight line, and converting the size of the 2D image on the basis of the obtained size conversion ratio.

2. The method of claim 1, wherein the 3D image comprises a computed tomography (CT) image obtained by photographing an upper-and-lower jaw area, and the 2D image comprises a cephalo image obtained by X-raying a profile of the face.

3. The method of claim 1, wherein the matching comprises:

when a plane associated with a front of the face corresponds to a x-z plane of the 3D space, causing the head to be oriented to face a positive direction of the z-axis; and when a plane associated with a side of the face corresponds to a y-z plane of the 3D space, causing the face to be orientated to face a negative direction of the y-axis.

4. The method of claim 1, wherein the secondarily positioning of the registration image comprises secondarily positioning the registration image on the basis of a third landmark in the registration image, wherein the third landmark comprises a third landmark (A) related to an orbitale, a third landmark (B) related to a porion, and a third landmark (C) related to a nasion.

5. A method of performing registration between a plurality of images of different dimensions by one or more processors of a computing device, the method comprising:

primarily positioning a three-dimensional (3D) image in a 3D space having x-axis, y-axis, and z-axis, by identifying a first landmark in the 3D image;

generating a registration image by registration between the primarily positioned 3D image and a two-dimensional (2D) image; and secondarily positioning the registration image, wherein the first landmark comprises a first landmark (A), a first landmark (B), a first landmark (C), and a first landmark (D), wherein the first landmark (A) and the first landmark (B) are related to left and right sides of a face, wherein the first landmark (C) and the first landmark (D) are related to front and rear sides of the face, wherein the primarily positioning of the 3D image comprises:

performing y-axis rotation about the first landmark (C) to match a z-coordinate of the first landmark (A) with a z-coordinate of the first landmark (B); and performing z-axis rotation about the first landmark (C) to match a y-coordinate of the first landmark (A) with a y-coordinate of the first landmark (B), wherein the generating of the registration image comprises:

matching directions of a head and the face in the 3D image with those of the head and the face in the 2D image;

converting a size of the 2D image on the basis of the first landmark in the 3D image and a second landmark in the 2D image; and overlapping the 3D image and the 2D image by moving the size-converted 2D image on the basis of coordinates of the first landmark in the 3D image, wherein the second landmark comprises a second landmark (A) and a second landmark (B) related to the front and rear sides of the face, and wherein the overlapping of the 3D image and the 2D image comprises:

moving the size-converted 2D image to match coordinates of the second landmark (A) with the coordinates of the first landmark (C); and overlapping the 2D image with the 3D image so that a second straight line connecting the second landmark (A) and the second landmark (B) in the 2D image is connected and aligned with a first straight line connecting the first landmark (C) and the first landmark (D) in the 3D image, wherein the secondarily positioning of the registration image comprises secondarily positioning the registration image on the basis of a third landmark in the registration image, wherein the third landmark comprises a third landmark (A) related to an orbitale, a third landmark (B) related to a porion, and a third landmark (C) related to a nasion, and wherein the secondarily positioning of the registration image further comprises:

performing rotation about the x-axis to cause a first line connecting the third landmark (A) and the third landmark (B) to be parallel with the y-axis; and performing parallel translation of the registration image to cause the third landmark (C) in the rotated registration image to be an origin.

6. An apparatus for performing the method of claim 1, comprising:

a memory storing one or more instructions; and a processor configured to execute the one or more instructions stored in the memory, wherein the processor executes the one or more instructions to perform the method of claim 1.

7. A non-transitory recording medium readable by a computing device, which is hardware, and storing a program for performing the method of claim 1 when the recording medium is combined with the computing device.

* * * * *